United States Patent [19]
Reimer

[11] 3,845,457
[45] Oct. 29, 1974

[54] CABLE HOLDING SPRING CLAMP
[75] Inventor: William A. Reimer, Wheaton, Ill.
[73] Assignee: GTE Automatic Electric Laboratories Incorporated, Northlake, Ill.
[22] Filed: Nov. 1, 1973
[21] Appl. No.: 411,953

[52] U.S. Cl............. 339/103 R, 24/134 R, 339/274
[51] Int. Cl............................................. H01r 13/58
[58] Field of Search......... 339/103, 274; 24/249 SL, 24/134 R

[56] References Cited
UNITED STATES PATENTS
631,669   8/1899   Rakin................................ 24/134 R
3,686,622 8/1972   Bonhomme........................ 339/274

FOREIGN PATENTS OR APPLICATIONS
29,662  2/1956  Germany......................... 339/103 R
65,961  3/1969  Germany............................. 339/274

Primary Examiner—Joseph H. McGlynn
Attorney, Agent, or Firm—Robert F. Van Epps

[57] ABSTRACT

A spring clamp for longitudinally securing a cable comprises a housing with a rotatable cammed spring clamp disposed therein at a position adjacent a cable to be secured. Rotation of the spring clamp compresses the cable within the housing to thereby provide the clamping force. A tongue portion on the clamp is provided such that upon complete rotation it seats in a corresponding groove in the housing to lock the clamp on the cable.

6 Claims, 6 Drawing Figures

3,845,457

CABLE HOLDING SPRING CLAMP

BACKGROUND OF THE INVENTION

1. Field of the Invention

The present invention relates generally to the field of cable clamps and more particularly to a new and improved spring clamping device.

2. Description of the Prior Art

Normally, in order to provide a removable connection between two wires or to clamp a cable jacket near the point where the cable terminates a compression clamp is used. One of the major disadvantages which has heretofore been exhibited by prior art compression clamps, especially when two large diameter wires are to be spliced together, is that in time the wire or cable jacket will cold flow resulting in a reduction of the clamping force. Further, the actual clamping force obtained with the prior art devices is not easily established and the ultimate quality of the connection is not assured.

SUMMARY OF THE INVENTION

From the preceding discussion it will be understood that among the various objectives of the present invention is the provision of a spring clamp arrangement which applies a readily removable and known clamping force and an indication that the proper force has been applied. To this end there is provided a housing (having a cable receiving receptacle) in which is disposed a spring clamp. The spring clamp has an integral cam portion rotatably mounted through the housing such that upon rotation of the cam the spring clamp is compressed against the cable. The cam portion is provided with a longitudinal tongue which, upon complete rotation of the cam, seats in a corresponding groove in the housing to thereby lock the cable in place.

The foregoing as well as other objects, features and advantages of the present invention will become more readily understood from the following detailed description taken in conjunction with the appended drawings.

DESCRIPTION OF THE PREFERRED EMBODIMENT

Figure 1:
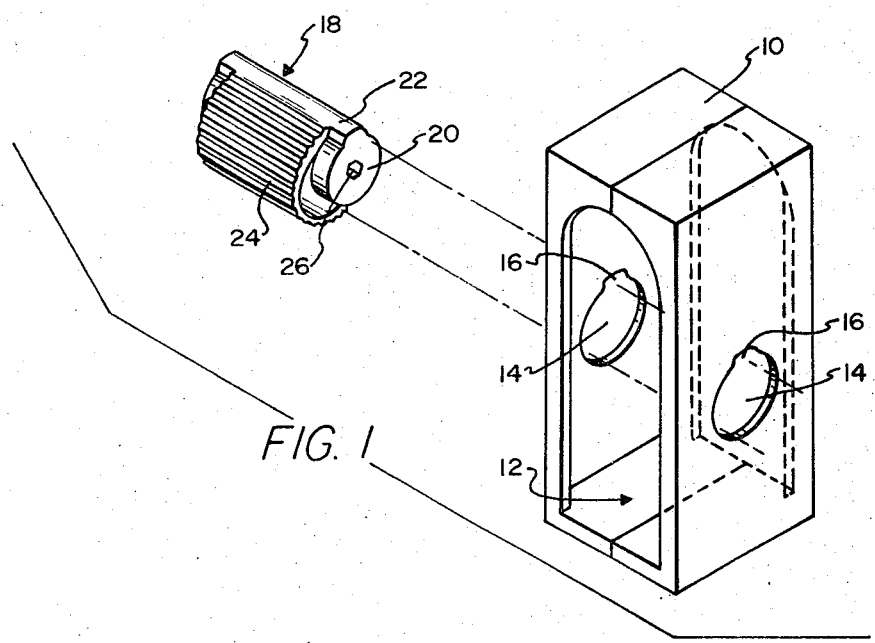
FIG. 1 is an exploded view of a spring clamp and housing assembly constructed in accordance with the present invention.

With reference now to FIG. 1 there is shown a housing 10 which may be of any convenient external configuration and having an internal cable receiving receptacle 12. Through opposed sides of the housing 10 and on an axis transverse to the receptacle 12 there are disposed basically round mounting apertures 14 each having a groove 16 disposed on a portion of the periphery thereof. An integrally formed cam and spring clamp 18 is adapted for mounting in the apertures 14 such that it is rotatable about its longitudinal axis. The cam 20 is provided with a longitudinal rib or tongue 22 which is adapted to seat in the grooves 16. The relative size and shape of the apertures 14 and cam 20 is such that the cam is fully rotatable. A spring clamping member 24 extends spirally outward from the cam 20 and is preferably ribbed. The ends of the cam are further provided with any type of tool receiving slot or aperture 26 or alternatively may be provided with a handle of any convenient type.

Figure 2A:
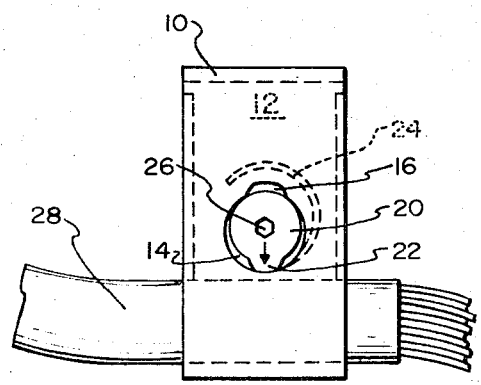
FIGS. 2A-2C are side views partially in phantom illustrating the operation of the clamp shown in FIG. 1.
Figure 2B:
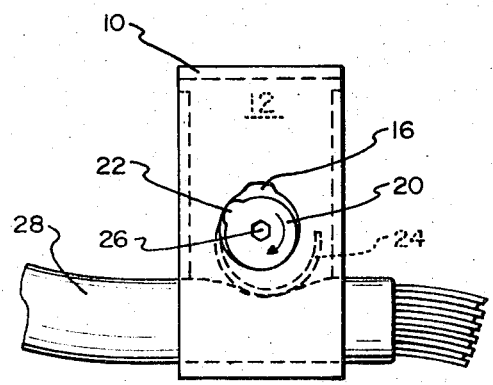
Figure 2C:
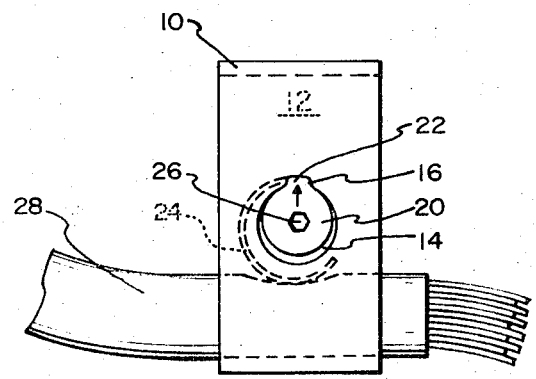

Turning to FIGS. 2A-2C the operation of the assembly of FIG. 1 may be more clearly shown. Elements common to those shown in FIG. 1 are identified by like reference numerals. A cable 28 or other line to be secured is inserted into the receptacle 12 as shwon in FIG. 2A while the spring clamp 24 is in a withdrawn position. In FIG. 2B the cam and spring clamp 18 has been partially rotated such that the spring 24 engages and begins to place pressure on the cable 28 to thus provide the primary clamping force. Further rotation of the cam and spring clamp 18 applies further clamping force and when the design force is reached the tongue 22 seats in the groove 16 locking the assembly in place. The spring clamp 24 being integrally formed with the cam 20 permits the entire unit to translate as it locks into place without affecting the clamping action. Under the compression of the spring clamp 24 a reliable and known clamping force is applied to the cable regardless of whether cable cold flow occurs. Finally it is preferred in the practice of this invention that the leading edges of the tongue 22 and groove 16 be slightly sloped such that the cam 20 may be rotated past the locking position shown in FIG. 2C to easily unlock the clamp.

Figure 3:
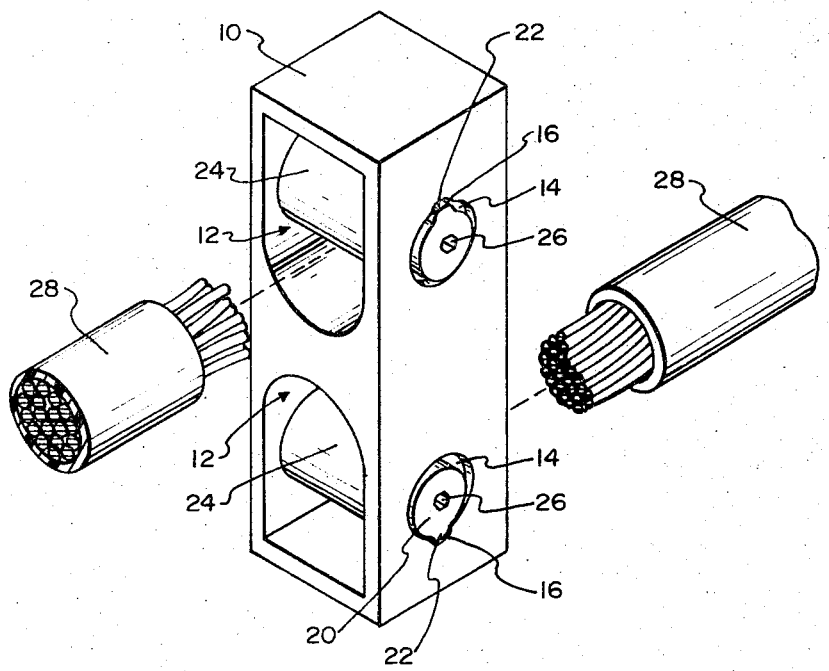
FIG. 3 is an elevation view of a solderless wire connector block in accordance with the present invention.

FIG. 3 illustrates a solderless wire connector wherein two clamping devices of the type illustrated in FIGS. 2A-2C are incorporated into a single electrically conductive housing. Again like elements are identified by like reference characters. Each wire 28 is stripped and inserted into individual receptacles 12 and individually clamped in the embodiment shown. It will be understood, however, that more than one wire could also be inserted into the single receptacle of the embodiment of FIGS. 2A-2C as well to provide the electrical connection.

Figure 4:
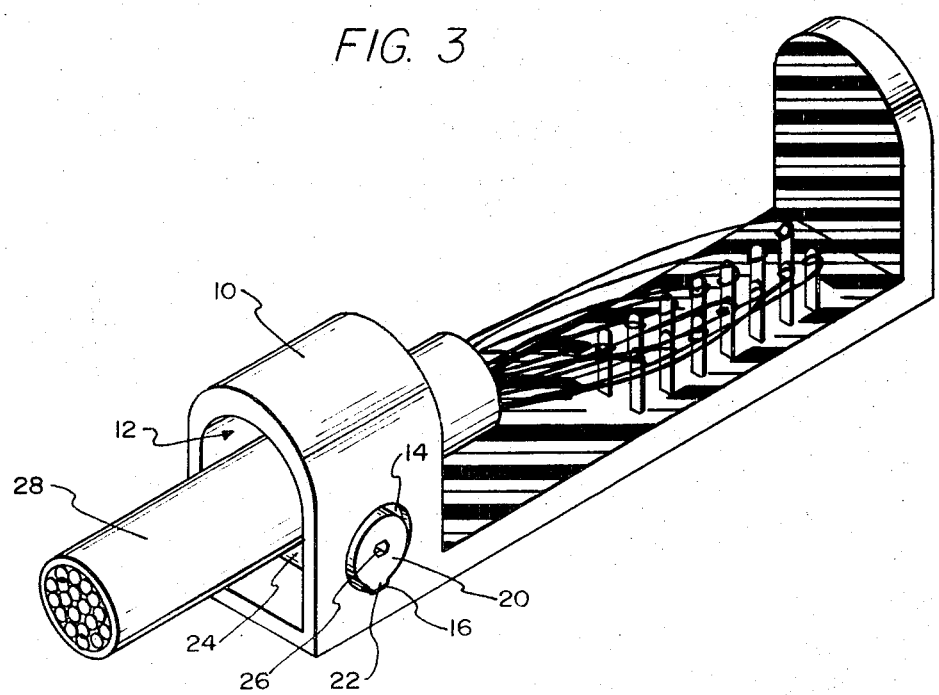
FIG. 4 is an elevation view of a cable connector housing incorporating the clamp of the present invention.

Finally FIG. 4 is a partially cut away elevation view of a cable connector or plug incorporating the clamping arrangement of the present invention. The housing 10 includes a plurality of terminals 30 to which the individual cable wires 32 may be terminated. The body of the cable 28 is then clamped reliably into place as described above.

From the foregoing it will be seen that the Applicant has provided a new and novel cable holding spring clamp wherein the objective set forth hereinabove is efficiently met. Since certain changes in the above-described construction will occur to those skilled in the art without departure from the scope of the invention, it is intended that all matter set forth in the description or shown in the appended drawings shall be interpreted as illustrative and not in a limiting sense.

Having described what is new and novel and desired to secure by Letters Patent, what is claimed is:

1. A cable holding spring clamp comprising
   a housing having a cable receiving aperture disposed therein;

an integrally formed cam and spring clamp element, said spring clamp extending spirally outward from said cam;

means for mounting said cam and spring clamp element transversely within said cable receiving aperture such that it is rotatable about a longitudinal axis;

means for rotating said cam and spring clamp element within said cable receiving aperture to thereby compress said spring clamp against said cable with a preselected force; and means for locking said cam and spring clamp element in rotation to thereby lock said cable between said spring clamp and said housing.

2. A clamp as recited in claim 1 wherein said housing is formed of an electrically conductive material.

3. A clamp as recited in claim 1 wherein said spring clamp is provided at the cable engaging surface thereof with a plurality of longitudinal ribs.

4. A clamp as recited in claim 1 wherein said cam and spring clamp mounting means comprises first and second round mounting apertures disposed through said housing at opposed sides of said cable receiving aperture and adapted to receive and retain said cam.

5. A clamp as recited in claim 4 wherein said locking means comprises a longitudinal tongue integrally formed on a portion of the surface of said cam, and a groove of complementary configuration in the periphery of each said mounting aperture and adapted to receive said tongue.

6. A clamp as recited in claim 5 wherein the leading edges of said tongue and said groove are tapered such that rotation of said cam beyond that to engage said tongue in said groove operates to release the compression of said spring clamp against said cable.

* * * * *